United States Patent
Kwon et al.

(10) Patent No.: US 11,824,451 B2
(45) Date of Patent: Nov. 21, 2023

(54) MULTI-PHASE BUCK-BOOST CONVERTER

(71) Applicant: Analog Devices, Inc., Wilmington, MA (US)

(72) Inventors: Dongwon Kwon, Cupertino, CA (US); Min Kyu Song, Milpitas, CA (US); Jindong Zhang, Fremont, CA (US); Min Chen, Fremont, CA (US)

(73) Assignee: Analog Devices, Inc., Wilmington, MA (US)

( * ) Notice: Subject to any disclaimer, the term of this patent is extended or adjusted under 35 U.S.C. 154(b) by 112 days.

(21) Appl. No.: 17/402,331

(22) Filed: Aug. 13, 2021

(65) Prior Publication Data

US 2023/0047637 A1    Feb. 16, 2023

(51) Int. Cl.
  *H02M 3/158*  (2006.01)
  *H02M 1/00*  (2006.01)

(52) U.S. Cl.
  CPC ....... *H02M 3/1586* (2021.05); *H02M 1/0009* (2021.05); *H02M 3/1582* (2013.01); *H02M 3/1584* (2013.01)

(58) Field of Classification Search
  CPC ............ H02M 3/1582; H02M 3/1584; H02M 3/1586; H02M 1/007
  See application file for complete search history.

(56) References Cited

U.S. PATENT DOCUMENTS

| | | | |
|---|---|---|---|
| 5,861,734 A * | 1/1999 | Fasullo | H02M 1/4216 323/222 |
| 7,692,938 B2 | 4/2010 | Petter | |
| 8,896,279 B2 | 11/2014 | Wu et al. | |
| 9,041,372 B2 | 5/2015 | Xie et al. | |
| 9,312,767 B2 | 4/2016 | Sandner et al. | |
| 9,774,259 B1 | 9/2017 | Ikriannikov et al. | |

(Continued)

FOREIGN PATENT DOCUMENTS

| CN | 110915117 A | 3/2020 |
|---|---|---|
| CN | 106712548 | 11/2020 |

(Continued)

OTHER PUBLICATIONS

"LTC3862-1: Multi-Phase Current Mode Step-Up DC DC Controller", Linear Technology Data Sheet, (2008), 42 pgs.

(Continued)

*Primary Examiner* — Alex Torres-Rivera
(74) *Attorney, Agent, or Firm* — Schwegman Lundberg & Woessner, P.A.

(57) ABSTRACT

A multi-phase buck-boost converter circuit comprises a buck circuit stage, a boost circuit stage, and a control circuit. The buck circuit stage is connected to an input of the buck-boost converter circuit to receive an input voltage. The boost circuit stage includes multiple boost circuits connected in parallel. The boost circuit stage is coupled to the buck circuit stage and an output of the multi-phase buck-boost converter circuit. Each boost circuit includes an inductor coupled to the buck circuit stage. The control circuit operates the multiple boost circuit stages out of phase with respect to each other in a boost mode, operates the buck circuit stage in a buck mode, and operates the multiple boost circuit stages out of phase with respect to each other and operates the buck circuit stage in a buck-boost mode.

17 Claims, 10 Drawing Sheets

(56) References Cited

U.S. PATENT DOCUMENTS

| | | |
|---|---|---|
| 9,985,528 B2 | 5/2018 | Romeo |
| 10,014,780 B2 | 7/2018 | Molari et al. |
| 10,312,798 B2 | 6/2019 | Green et al. |
| 10,333,314 B2 | 6/2019 | Dai et al. |
| 10,396,684 B2 | 8/2019 | Mu et al. |
| 10,476,403 B2 | 11/2019 | Deboy |
| 10,673,260 B2 | 6/2020 | Greening et al. |
| 10,811,971 B2 | 10/2020 | Ke |
| 2011/0241636 A1* | 10/2011 | Wu .................... H02M 3/1584 323/272 |
| 2012/0062030 A1* | 3/2012 | Xu ..................... H02M 3/1582 307/31 |
| 2013/0077362 A1* | 3/2013 | Kumar ................. H02M 7/125 363/49 |
| 2014/0084882 A1* | 3/2014 | Namekawa ......... H02M 3/1582 323/271 |
| 2014/0217974 A1* | 8/2014 | Kim ....................... B60L 53/24 320/109 |
| 2016/0006336 A1* | 1/2016 | Bennett ................ H02M 3/158 323/271 |
| 2021/0203233 A1 | 7/2021 | Chang |

FOREIGN PATENT DOCUMENTS

| | | |
|---|---|---|
| CN | 109314459 B | 1/2021 |
| JP | 2006141183 | 6/2006 |

OTHER PUBLICATIONS

Karthikeyan, M, "A Hybridization of Cuk and Boost Converter Using Single Switch with Higher Voltage Gain Compatibility", Energies, 13(9), 2312, (May 6, 2020), 24 pgs.

Khasiev, Victor, "Multiply the Power of a Boost Converter with a Versatile Phase Expander", Analog Devices Design Note, (2020), 3 pgs.

Pop-Calimanu, Ioana-Monica, "New Multiphase Hybrid Boost Converter with Wide Conversion Ratio for PV System", International Journal of Photoenergy, vol. 2014, Art. 637468, (Apr. 30, 2014), 17 pgs.

Zivanov, Milos, "Desing of Multiphase Boost Converter for Hybrid Fuel Cell Battery Power Sources", Paths to Sustainable Energy, INTECH 2010, pp. 359-404, (Nov. 2010), 47 pgs.

* cited by examiner

MULTI-PHASE BUCK-BOOST CONVERTER

BACKGROUND

Electronic systems can include devices that require a regulated power source. Power circuits can be used to provide a circuit supply rail having a regulated voltage. Some power circuits are switching converter circuits that use switching to energize and de-energize a magnetic circuit element (e.g., an inductor) to provide a regulated voltage at the output. Losses in switching converter circuits can limit their power delivery capability.

SUMMARY OF THE DISCLOSURE

This document relates generally to switching power converters and methods of their operation. An example of a multi-phase buck-boost converter circuit includes a buck circuit stage, a boost circuit stage, and a control circuit. The buck circuit stage is connected to an input of the buck-boost converter circuit to receive an input voltage. The boost circuit stage includes multiple boost circuits connected in parallel. The boost circuit stage is coupled to the buck circuit stage and an output of the multi-phase buck-boost converter circuit. Each boost circuit includes an inductor coupled to the buck circuit stage. The control circuit operates the multiple boost circuit stages out of phase with respect to each other to generate an output voltage when the input voltage is less than the output voltage, operates the buck circuit stage to generate the output stage when the input voltage is greater than the output voltage; and operates the multiple boost circuit stages out of phase with respect to each other and operates the buck circuit stage to generate the output voltage when the input voltage is within a predetermined range of the output voltage.

An example of a method of operating a switching converter circuit includes operating multiple boost circuit stages out of phase with respect to each other to generate an output voltage from an input voltage to the switching supply circuit when the input voltage is less than the output voltage, wherein the multiple boost circuit stages are connected in parallel to each other and to an output of the switching supply circuit; operating the single buck circuit stage of the switching supply circuit to generate the output voltage when the input voltage is greater than the output voltage, wherein the buck circuit stage is coupled to an input of the switching supply circuit and the multiple boost circuit stages, and operating the multiple boost circuit stages out of phase with respect to each other and operating the buck circuit stage to generate the output voltage when the input voltage is within a predetermined range of the output voltage.

An example of a switching converter circuit includes a multi-phase boost circuit stage including multiple boost circuits connected in parallel to an output of the switching converter circuit with each boost circuit including an inductor, a single-phase buck circuit stage coupled to an input of the switching converter and the inductors of the multiple boost circuits, and a control circuit. The control circuit is configured to generate multiple clock signals to drive the multiple boost circuits in a boost mode, wherein a first clock signal for a first boost circuit is out of phase with another clock signal for another boost circuit, use the multiple clock signals to drive the multiple boost circuits and the single-phase buck circuit stage in a buck-boost mode, and generate one clock signal to drive the buck circuit stage in a buck mode, wherein the one clock signal is used to energize the inductors of the multiple boost circuits.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Power circuits may need to provide a fixed or stable output voltage as an electrical circuit supply for an electronic system. Some power circuits are switching converter circuits that convert the input voltage to a regulated output voltage. The regulation is typically achieved by recurrently charging a magnetic circuit element, such as an inductor, from an energy source and then discharging the energy of the magnetic circuit element to drive a load. The charging and discharging can be accomplished using electronic switches that include transistors.

The regulated voltage conversion can provide a regulated output voltage that is higher than the input voltage of the regulator (a boost converter), lower than the input voltage (a buck converter), or any of higher than, lower than, or equal to, the input voltage (a buck-boost converter).

Figure 1:
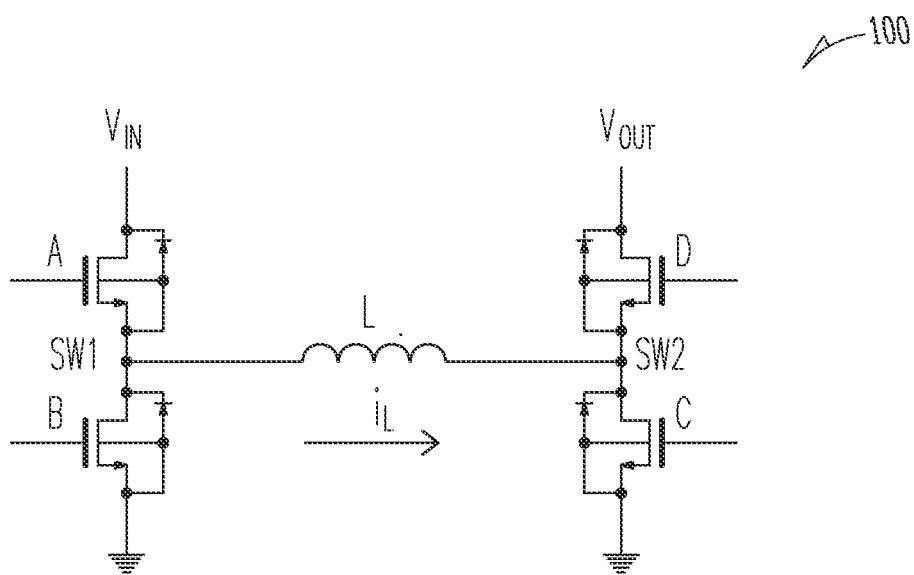
FIG. 1 is a circuit diagram of an example of a buck-boost switching converter circuit.

FIG. 1 is a circuit diagram of portions of an example of a buck-boost switching converter circuit. The switching converter circuit 100 includes an inductor L and four power switches (A, B, C, D) that can be field effect transistor (FET) switches. The diodes shown with the transistors represent the parasitic body diodes of the transistors. When the input voltage $V_{IN}$ is less than the output voltage $V_{OUT}$, the converter circuit can operate in the boost mode by switching the C and D power switches connected to circuit node SW2 to charge and discharge the inductor L. Circuit node SW1 is connected to $V_{IN}$ via power switch A, which is always turned on in the boost mode. When $V_{IN}$ is close to $V_{OUT}$, all four power switches can turn on and off in the buck-boost mode to deliver energy from $V_{IN}$ to $V_{OUT}$ through the inductor L. When $V_{IN}$ is greater than $V_{OUT}$, the system operates in the buck mode where power switches A and B energize and de-energize the inductor while circuit node SW2 is connected to $V_{OUT}$ via power switch D, which is always turned on in the buck mode.

One of the main challenges in using the 4-switch buck-boost converter circuit of FIG. 1 in an electric system is the thermal limitation of the circuit during the boost operation. For a given output voltage and output current, the input current and the inductor current increase for lower $V_{IN}$. The high inductor current increases both the conduction and switching losses quickly in the power switches C and D in the boost mode. The losses increase the temperatures in the C and D power switches, and these temperatures become the thermal bottleneck that limits the maximum power delivery capability of the switching converter circuit 100 in the boost mode.

Another challenge in using the switching converter circuit 100 is the selection of the inductor L and the output capacitor $C_{OUT}$ (not shown) of the converter. To handle the high inductor current with low losses, the inductor L tends to be bulky and large in size, because the desired saturation current and the direct current resistance (DCR) need to be high and low, respectively. In addition, the greater inductor current in the boost operation leads to a greater output root-mean-square (RMS) current that can induce more equivalent series resistance (ESR) loss in the output capacitor, which can compromise the lifetime of the device.

Figure 2:
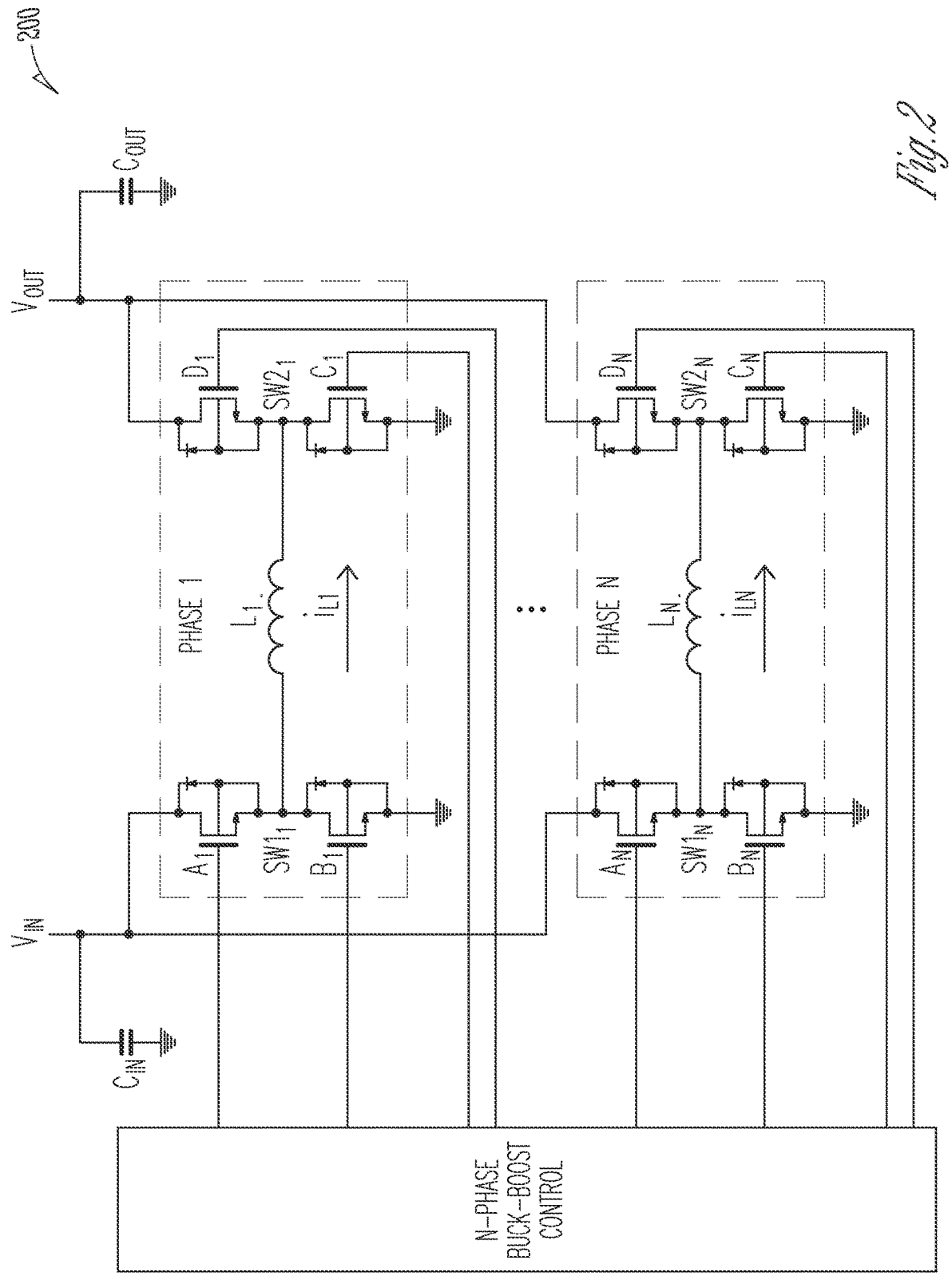
FIG. 2 is a circuit diagram of another example of a buck-boost switching converter circuit.

FIG. 2 is a circuit diagram of another example of a buck-boost switching converter circuit 200. In the circuit of FIG. 2, multiple 4-switch buck-boost converters are connected in parallel. To address the thermal limitation of the circuit of FIG. 1, each 4-switch buck-boost converter is operated at a different phase of energizing and de-energizing the inductors to spread the thermal dissipations among multiple phases. The approach of FIG. 2 can also relieve the current requirements on the inductor and the output capacitor as each inductor ($L_1 \ldots L_N$) will handle divided currents with interleaved phases.

However, the complexity and the cost of the switching converter circuit 200 increases quickly with the number of phases. For example, a two-converter circuit (N=2) to implement two-phase converting will use eight power switches. A four-converter circuit (N=4) to implement four-phase converting will use sixteen power switches. The complexity of the controller and the gate-drives for these power switches create challenges for the interconnection and the PCB layout. Moreover, the circuit approach of FIG. 2 uses two switching circuit nodes for each phase (or 2N-SW circuit nodes). The electro-magnetic interference (EMI) noise from the 2N-SW circuit nodes of the N-phase buck-boost converter may make it more difficult to pass EMI compliance standards.

Figure 3:
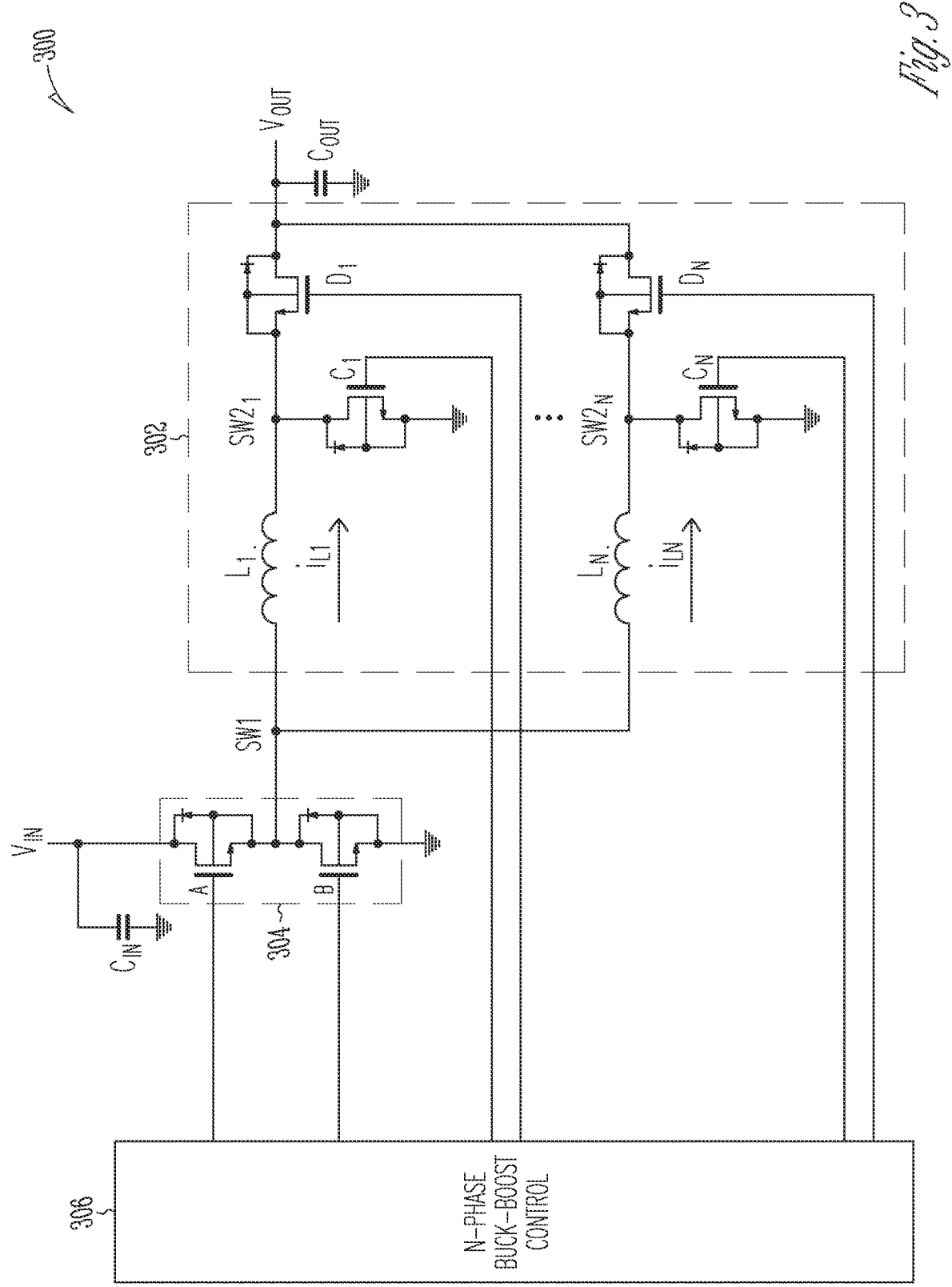
FIG. 3 is a circuit diagram of another example of a buck-boost switching converter circuit.

FIG. 3 is a circuit diagram of an example of an improved approach for a buck-boost switching converter circuit 300. The switching converter circuit 300 addresses the thermal limitations of the power switches by using the multi-phase boost power stages but with a reduced number of power switches and with less SW circuit nodes.

The switching converter circuit 300 includes a multi-phase boost circuit stage 302 and a single-phase buck circuit stage 304. The single buck circuit stage 304 has one top power switch (A) and one bottom power switch (B). The boost circuit stage 302 has one bottom power switch per phase ($C_1 \ldots C_N$) and one top power switch per phase ($D_1 \ldots D_N$). Each phase of the boost circuit stage 302 employs one inductor ($L_1 \ldots L_N$) whose currents are interleaved with the other phase inductor currents to reduce the output RMS currents. No inductors other than the boost circuit stage inductors ($L_1 \ldots L_N$) are used for the single buck circuit stage 304. The buck circuit stage 304 energizes and de-energizes the inductors ($L_1 \ldots L_N$) in the buck mode.

The switching converter circuit 300 operates in the multi-phase boost mode when the input voltage is lower than the output voltage. When the input voltage is close to the output voltage, the switching converter circuit 300 will operate in the multi-phase buck-boost mode. When the input voltage is greater than the output voltage, the switching converter circuit 300 will operate in the single-phase buck mode and step the voltage down through the single-phase buck mode operation. The control circuitry 306 provides the control signals and clock signals used to operate the converting modes. The control circuitry 306 may transition between each mode automatically by sensing the input and the output voltages and transitioning the mode of the switching converter circuit accordingly.

Figure 4:
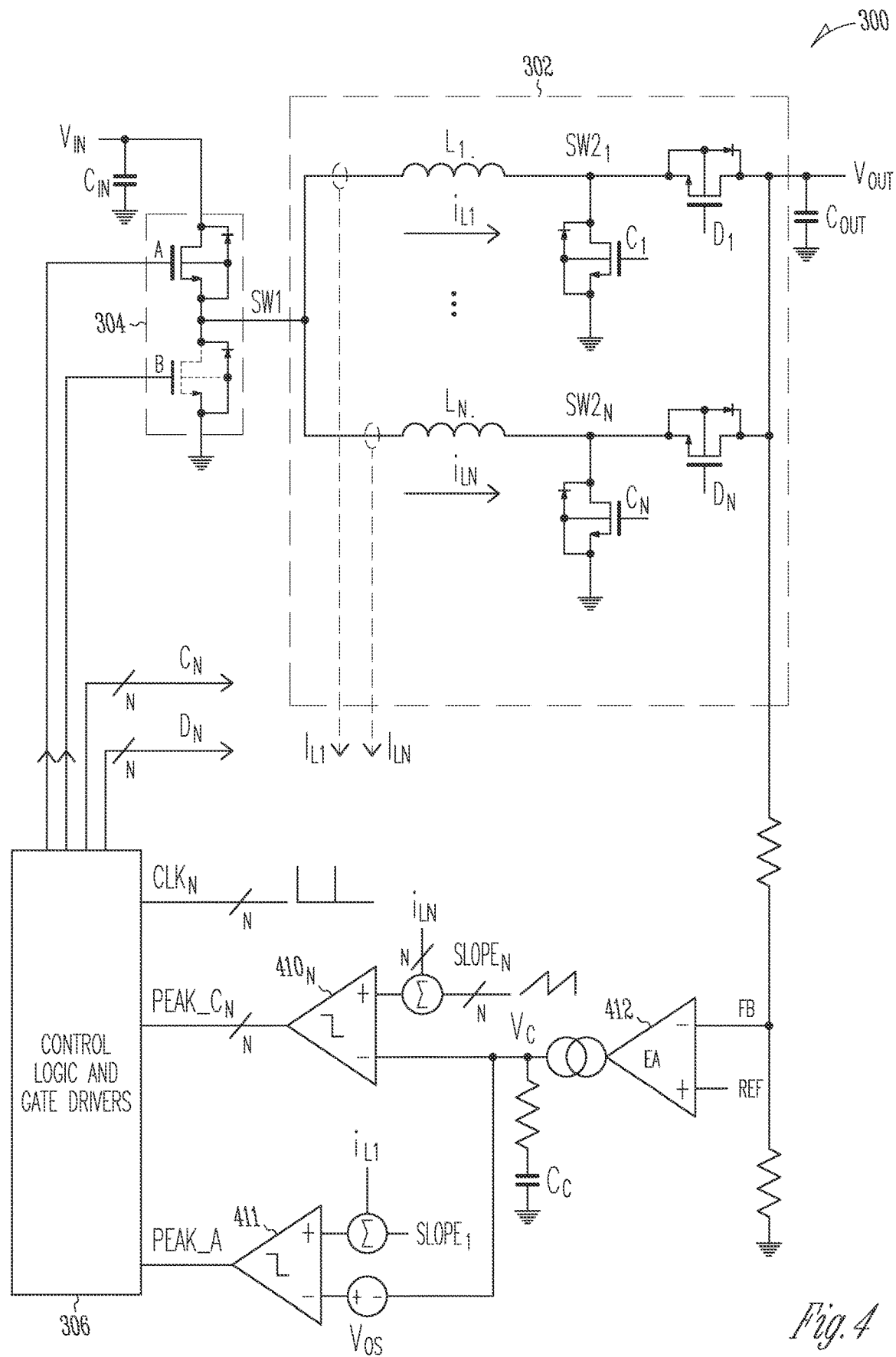
FIG. 4 is a circuit diagram of the switching converter circuit of FIG. 3 in the boost mode.

FIG. 4 is a circuit diagram of the switching converter circuit 300 of FIG. 3 in the boost mode. In the boost mode, power switch A is always on to provide $V_{IN}$ to the multi-phase boost circuit stage 302. Power switch B is always off in the boost mode. Control circuitry 306 generates the drive signals for the power switches A, B, $C_1 \ldots C_N$, and $D_1 \ldots D_N$. A control voltage $V_C$ is generated using error amplifier 412 based on a difference between the output voltage and a target voltage. The output of the error amplifier is a current that charges capacitor $C_C$ to generate $V_C$.

FIG. 4 also shows peak inductor current detection circuitry $410_N$ for the N phases of the multi-phase boost circuit stage. The peak inductor current detection circuitry $410_N$ controls the switching of the $C_1 \ldots C_N$ power switches. The peak detection level is set using the control voltage $V_C$ and the slope compensation signal $SLOPE_N$ for the phase. The slope compensation signal is used to produce an inductor current limit that decreases during a switching cycle. Slope compensation can be useful to eliminate sub-harmonic oscillation. FIG. 4 also shows peak inductor current detection circuitry 411 for power switch A, but the peak inductor current detection circuitry 411 is not used to control power switch A in the boost mode because power switch A is always on.

Figure 5:
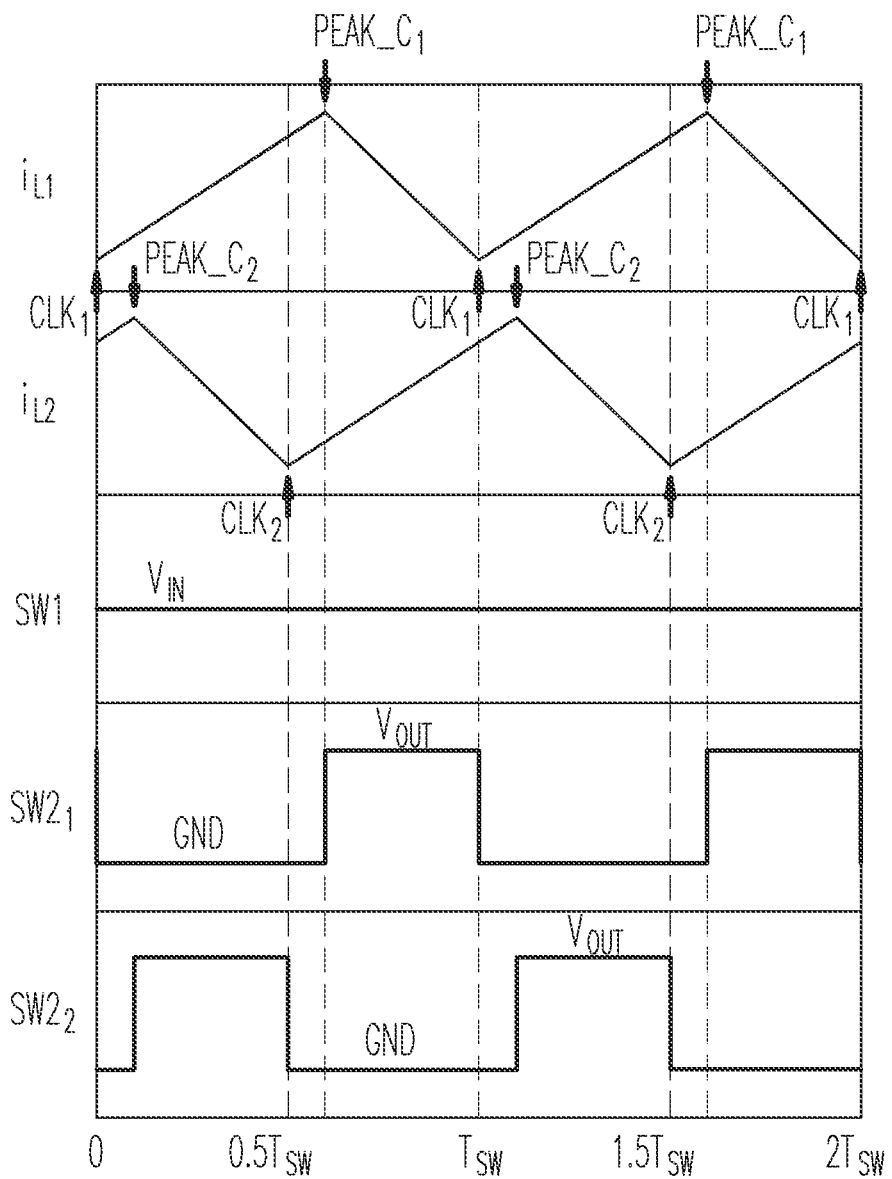
FIG. 5 is an illustration of waveforms related to operation of the switching converter circuit of FIG. 3 in the boost mode.

FIG. 5 is an illustration of waveforms related to operation of the switching converter circuit 300 of FIG. 3 in the boost mode for the case where the number of phases is two (N=2). The waveforms in FIG. 5 include the inductor current of the two inductors L1 and L2 ($i_{L1}$ and $i_{L2}$), boost clock signals for the phases ($CLK_1$ and $CLK_2$), and the voltage at circuit nodes SW1, $SW2_1$, $SW2_2$.

The switching converter circuit 300 starts energizing the inductor of the first phase $L_1$ by turning on power switch $C_1$ at the rising edge of the $CLK_1$ signal. The $L_1$ current ($i_{L1}$) will increase until the peak inductor current detection circuitry detects that $i_{L1}$ has reached a peak current level that is set by the $V_C$ voltage and the slope compensation for the first phase $SLOPE_1$. When the peak inductor current is detected (e.g., signal $PEAK\_C_1$ becomes active), the switching converter circuit 300 turns off power switch $C_1$ and turns on power switch $D_1$ to de-energize the inductor current to the output until the next $CLK_1$ rising edge.

The power switch $C_2$ is turned on at the rising edge of the $CLK_2$ signal to energize the second phase inductor $L_2$. The $CLK_2$ signal is 180 degrees out of phase with the $CLK_1$ signal. The $L_2$ current ($i_{L2}$) increases until the peak detection circuitry detects that $i_{L2}$ has reached a peak current level that is set by the $V_C$ voltage and the slope compensation for the second phase $SLOPE_2$. When the peak current is detected (e.g., signal PEAK_$C_2$ becomes active), the switching converter circuit 300 turns off power switch $C_2$ and turns on power switch $D_2$ to de-energize the inductor current to the output until the next $CLK_2$ rising edge.

For an N-phase switching circuit the CLK signals for each phase can be evenly spaced throughout a switching period. For example, the CLK signals are spaced 180 degrees out of phase for a 2-phase boost circuit stage, the CLK signals are spaced 120 degrees out of phase for a 3-phase boost circuit stage, etc.

The inductor $L_N$ for the $N^{th}$ phase of the boost circuit will start energizing when the power switch $C_N$ turns on at the rising edge of $CLK_N$ signal. The inductor current for the $N^{th}$ phase inductor, $i_{LN}$, will increase until the system detects $i_{LN}$ reached a peak current level set using the same control voltage $V_C$ and the slope compensation for the $N^{th}$ phase $SLOPE_N$. The amount of the slope compensation for each phase may be the same. The $SLOPE_N$ ramp signal will start at the $CLK_N$ rising edge. Because all N-phase inductors in the boost mode will experience the same input voltage $V_{IN}$ (provided to circuit node SW1 via power switch A) and the same output voltage $V_{OUT}$, the duty cycle in each phase is the same. Because the control voltage $V_C$ and the slope compensation for each phase are the same at the peak current detection point for each phase, the inductor currents in all phases ($i_{L1} \ldots i_{LN}$) can be balanced without any additional current-balancing servo loops. This reduces the number of circuit components needed and reduces complexity of the system.

Figure 6:
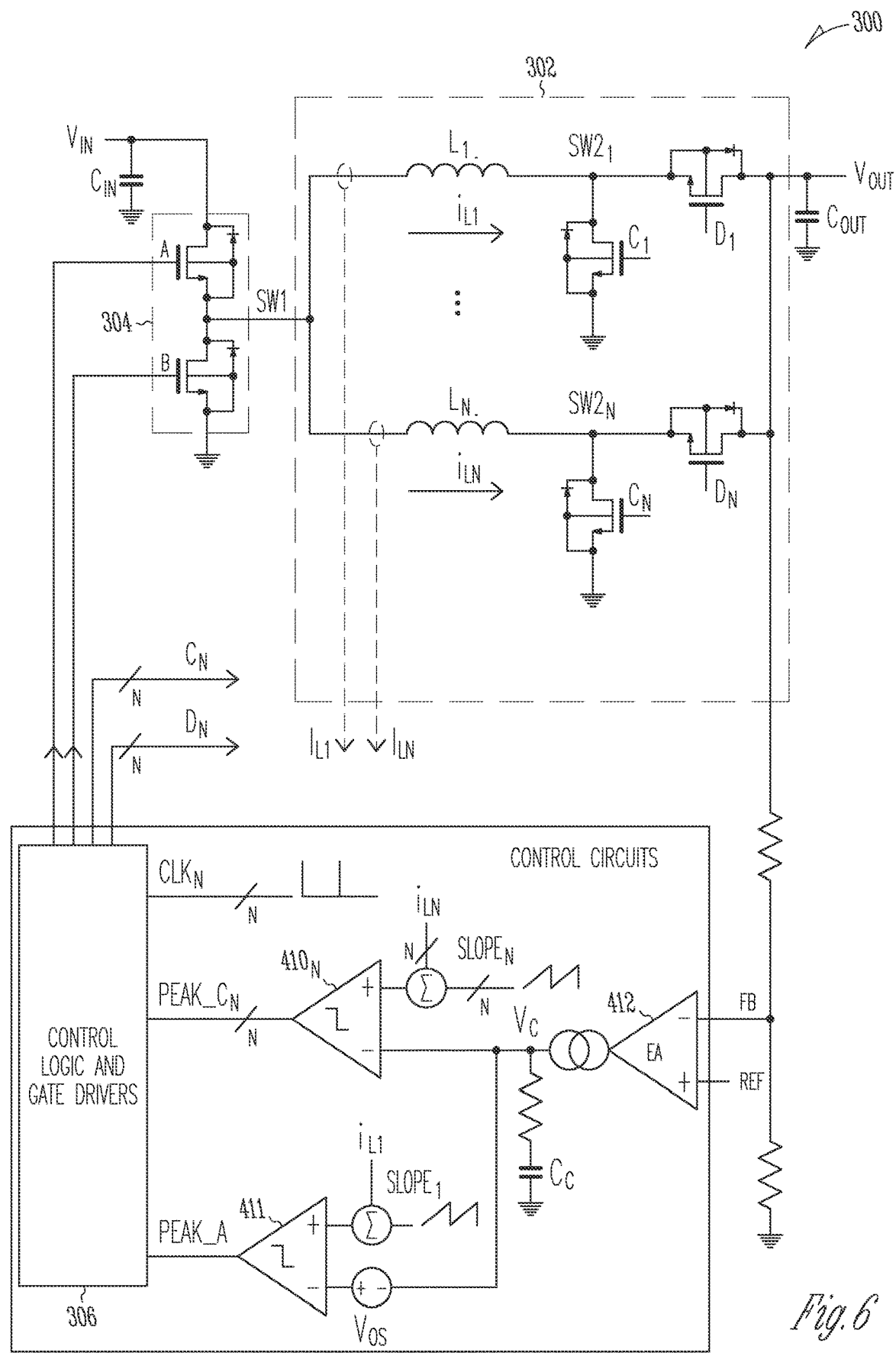
FIG. 6 is a circuit diagram of the switching converter circuit of FIG. 3 in the buck-boost mode.

FIG. 6 is a circuit diagram of the switching converter circuit 300 of FIG. 3 operating in the buck-boost mode. In the buck-boost mode, all the power switches will turn on and off once in every switching cycle, including power switches A and B.

Figure 7:
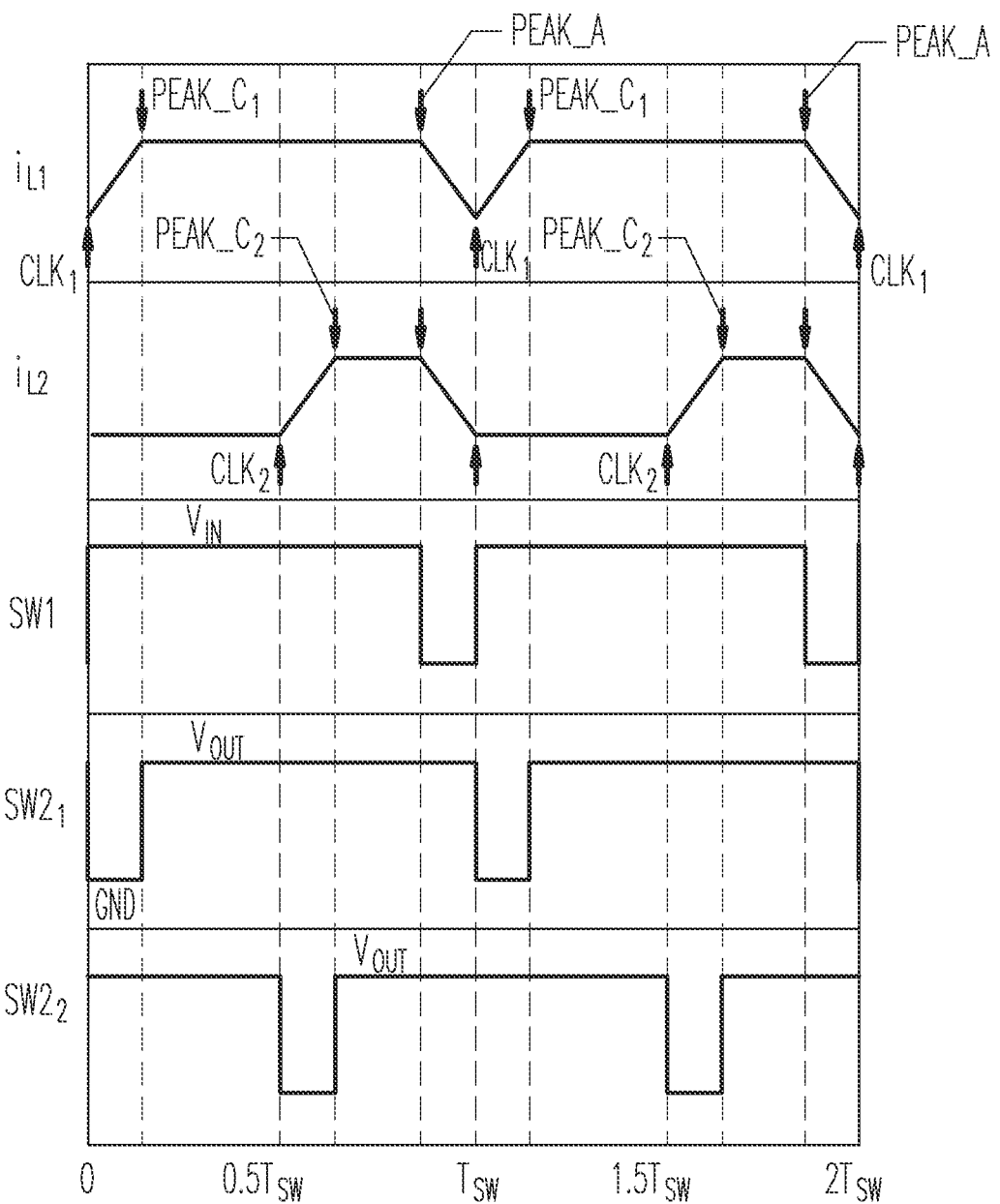
FIG. 7 is an illustration of waveforms related to operation of the switching converter circuit of FIG. 3 in the buck-boost mode.

FIG. 7 is an illustration of waveforms related to operation of the switching converter circuit 300 of FIG. 3 in the buck-boost mode for the case where the number of phases of the boost circuit stage 302 is two (N=2). The switching converter circuit 300 starts energizing the inductor of the first phase $L_1$ by turning on power switch A and power switch $C_1$ at the rising edge of $CLK_1$ signal. The $L_1$ current ($i_{L1}$) will increase until the switching converter circuit 300 detects the inductor current has reached a peak current level set by the $V_C$ voltage and the slope compensation for the first phase, $SLOPE_1$, and signal PEAK_$C_1$ becomes active. Then power switch $C_1$ is turned off and power switch $D_1$ is turned on to redirect the inductor current to the output $V_{OUT}$. Power switch A is still on.

Beginning with the rising edge of $CLK_1$ and before the rising edge of $CLK_2$, the second phase inductor $L_2$ will be connected to the input through power switch A and to the output through the $D_2$ power switch. At the rising edge of $CLK_2$, the $D_2$ power switch is turned off and the $C_2$ power switch is turned on to energize the second phase inductor $L_2$. The energizing of $L_2$ will continue until the peak inductor current detection circuit detects that the $L_2$ current reached a peak set by the same $V_C$ and the slope compensation for the second phase, $SLOPE_2$, and signal PEAK_$C_2$ becomes active. Analogous to the boost mode case, all the peak inductor currents in an N-phase switching converter circuit can be balanced without extra circuits.

Up to this point, the switch control for the buck-boost mode is identical to the boost mode counterpart. Unlike the boost mode however, the input and output voltage are similar in amplitude in the buck-boost mode. Thus, the inductor currents $i_{L1} \ldots i_{LN}$ need to be de-energized before the end of a switching cycle to meet the inductor volt-second balance. This can be accomplished by connecting SW1 node to circuit ground (GND) by turning power switch A off and turning power switch B on. This way, all N-phase inductor currents $i_{L1} \ldots i_{LN}$ can be de-energized to $V_{OUT}$. Using peak inductor current detection circuit 411, the control circuit logic determines the starting point of the de-energizing by comparing the inductor current for the first phase $i_{L1}$ to a reference voltage set by the same control voltage $V_C$ plus a DC offset voltage $V_{OS}$ with the slope compensation of the first phase, $SLOPE_1$. The de-energizing of all the inductors begins when signal PEAK_A becomes active. The end of the de-energizing will be determined by the rising edge of $CLK_1$ signal, at which point a new switching cycle begins.

Figure 8:
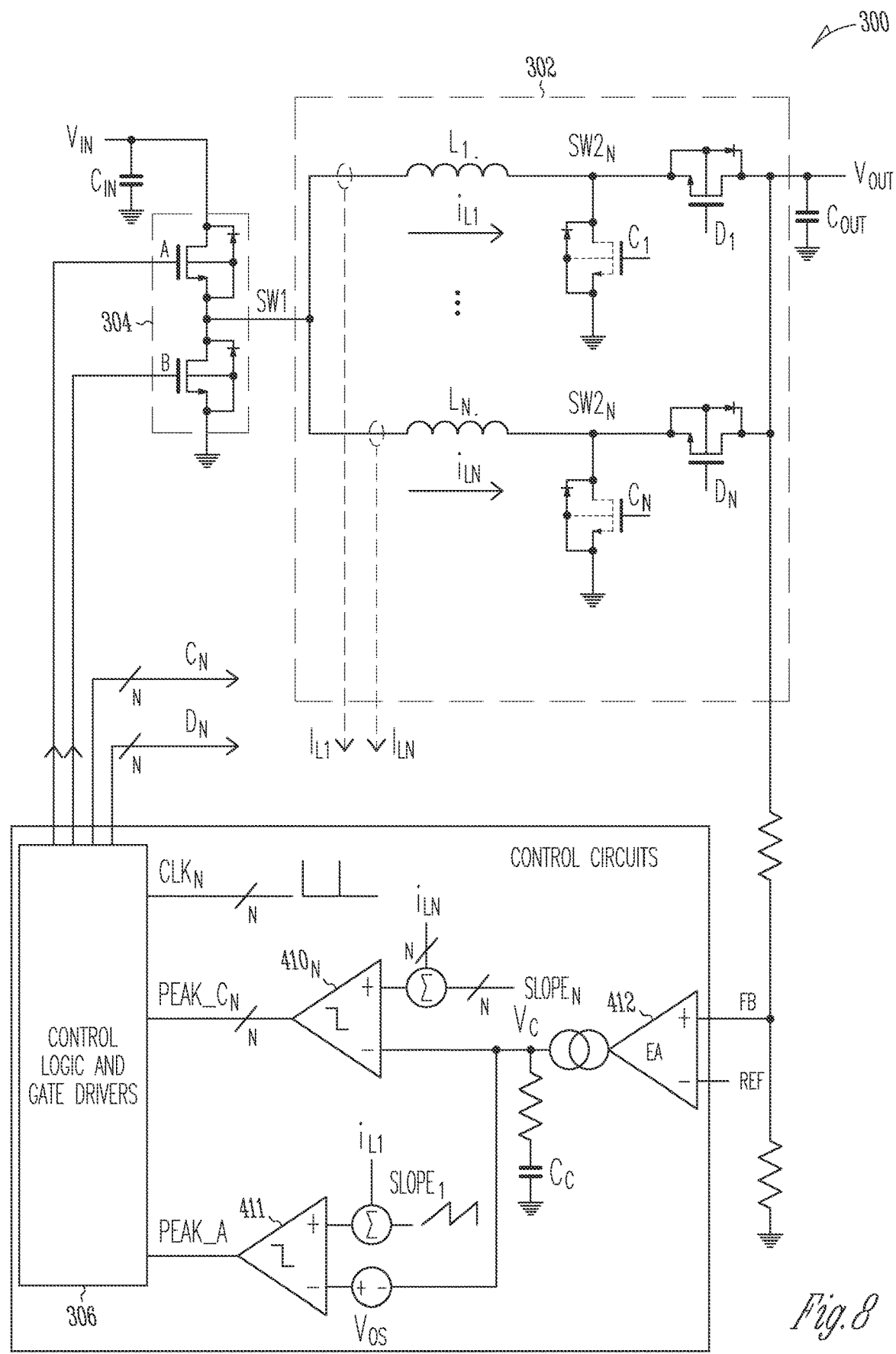
FIG. 8 is a circuit diagram of the switching converter circuit of FIG. 3 in the buck mode.

FIG. 8 is a circuit diagram of the switching converter circuit 300 of FIG. 3 in the buck mode. In the buck mode, all the power switches $C_1 \ldots C_N$ are off and power switches $D_1 \ldots D_N$ switches are on to connect the $SW2_1 \ldots SW2_N$ circuit nodes to $V_{OUT}$. This configuration effectively forms a single-phase buck converter using the multiple inductors $L_1 \ldots L_N$.

Figure 9:
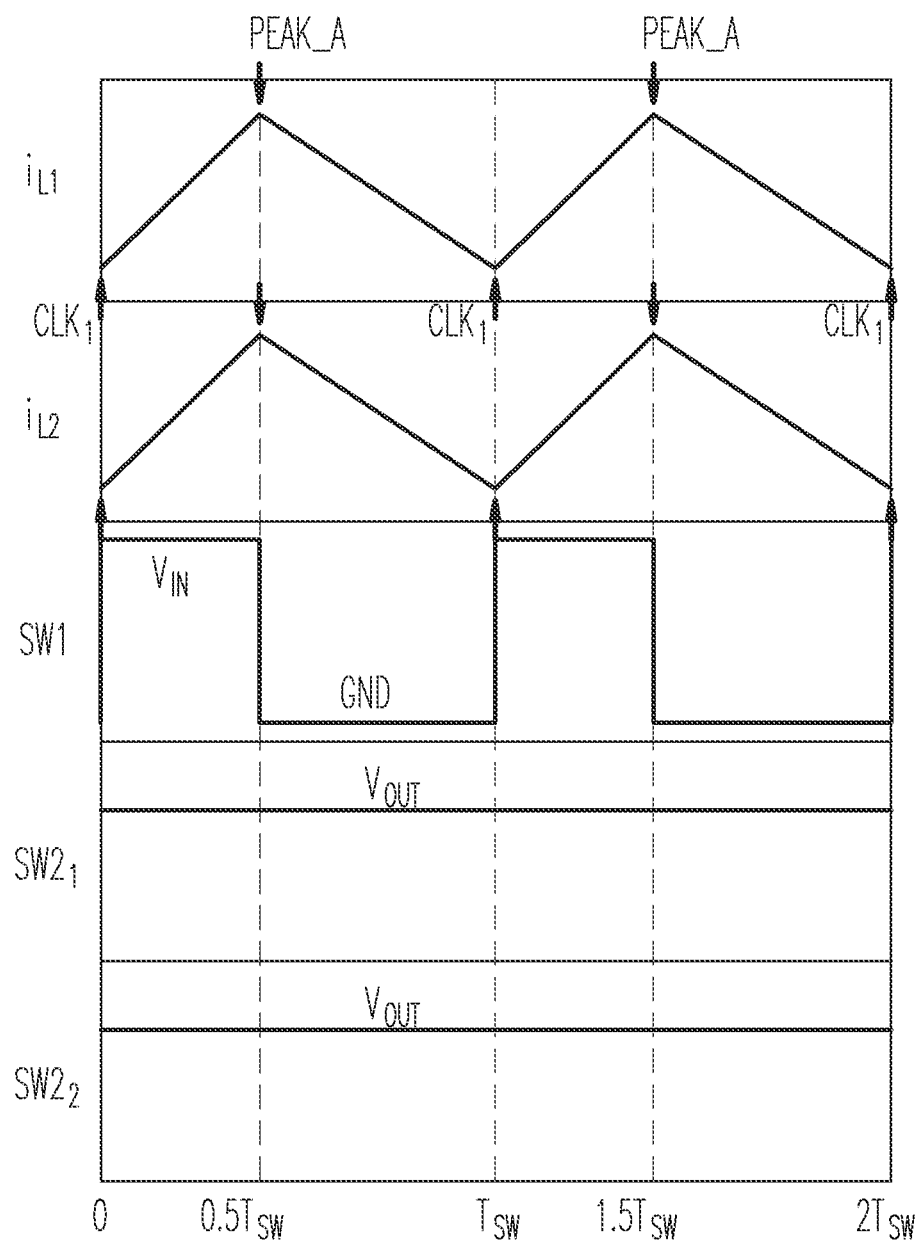
FIG. 9 is an illustration of waveforms related to operation of the switching converter circuit of FIG. 3 in the buck mode.

FIG. 9 is an illustration of waveforms related to operation of the switching converter circuit 300 of FIG. 3 in the buck mode for the case where the number of phases of the boost circuit stage 302 is two (N=2). The switching converter circuit 300 starts energizing the inductors by turning on power switch A at the rising edge of $CLK_1$ signal. The $i_{L1}$ and $i_{L2}$ inductor currents in all phases will increase until the switching converter circuit 300 detects that the inductor current $i_{L1}$ reached a peak set by the $V_C$ voltage plus the DC offset $V_{OS}$ with the slope compensation for the first phase, $SLOPE_1$, using peak inductor current detection circuitry 411. Note that this peak detection criterion is the same as the one used in the buck-boost mode when the control circuitry 306 determined to turn off power switch A and turn on power switch B. As it was for the buck-boost mode case, the switching converter circuit 300 turns off power switch A and turns on power switch B in the buck-mode to de-energize the inductor currents $i_{L1}$ and $i_{L2}$ to the output until the next $CLK_1$ rising edge.

Figure 10:
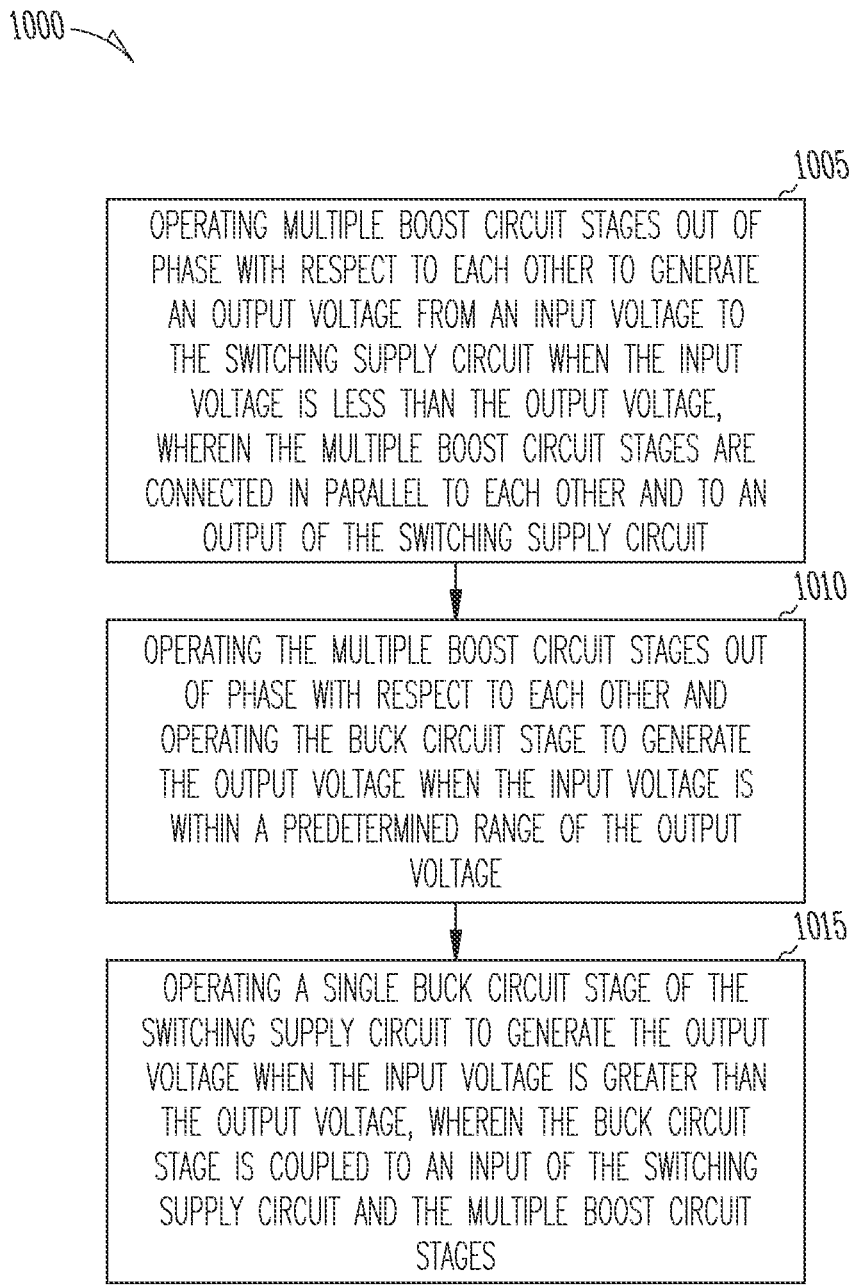
FIG. 10 is flow diagram of an example of a method of operating a switching supply circuit.

As an overview, FIG. 10 is a flow diagram of an example of operating a switching supply circuit. At block 1005, multiple boost circuit stages of the switching supply circuit are operated out of phase with respect to each other in a boost mode to generate an output voltage from an input voltage when the input voltage is less than the output voltage. The multiple boost circuit stages each include an inductor and the boost circuit stages are connected in parallel to an output of the switching supply circuit as shown in the example of FIG. 3. The circuit also includes a single buck circuit stage. The switches of the single buck circuit stage are configured to pass the input voltage to the inductors of the multiple boost circuit stages when the switching supply circuit is in the boost mode.

At block 1010, the multiple boost circuit stages are operated out of phase with respect to each other and the single-phase buck circuit stage is also activated, and together the multiple boost circuit stages and the single-phase buck stage generate the output voltage in a buck-boost mode when the input voltage is within a predetermined range of the output voltage.

At block 1015, the single buck circuit stage of the switching supply circuit is operated in a buck mode to generate the output voltage when the input voltage is greater than the output voltage. The single buck circuit stage is coupled to the input of the switching supply circuit and to the multiple boost circuit stages. The single buck stage energizes and de-energizes the inductors of the multiple boost circuit stages to generate the buck voltage. No additional buck stage inductors are needed. The switches of the boost circuit stages are configured to pass the energy from the inductors to the output when the switching supply circuit is in the buck mode.

The several examples of systems, devices, and methods described provide a buck-boost switching converter circuit that improves the maximum power delivery capability of conventional buck-boost converters by resolving the thermal bottleneck of the converter. The techniques require a smaller number of power switches and switching nodes, thereby reducing cost and complexity of the switch power supply systems, and also reducing noise from EMI. Moreover, the buck-boost switching converter circuit is multi-phase, and inductor currents in each channel are balanced using only one error amplifier and without any additional servo-loop requirements.

Additional Description and Aspects

A first Aspect (Aspect 1) includes subject matter (such as a multi-phase buck-boost converter circuit) comprising a buck circuit stage connected to an input of the buck-boost converter circuit to receive an input voltage, a boost circuit stage including multiple boost circuits connected in parallel, wherein the boost circuit stage is coupled to the buck circuit stage and an output of the multi-phase buck-boost converter circuit, and a control circuit. Each boost circuit includes an inductor coupled to the buck circuit stage. The control circuit is configured to operate the multiple boost circuit stages out of phase with respect to each other to generate an output voltage from the input voltage when the input voltage is less than the output voltage, operate the buck circuit stage to generate the output voltage when the input voltage is greater than the output voltage, and operate the multiple boost circuit stages out of phase with respect to each other and operate the buck circuit stage to generate the output voltage when the input voltage is within a predetermined range of the output voltage.

In Aspect 2, the subject matter of Aspect 1 optionally includes each boost circuit stage including a first switch circuit and a second switch circuit, and the buck circuit stage including a third switch circuit and a fourth switch circuit. The control circuit is optionally configured to operate the multi-phase buck-boost converter in a buck mode by activating the third switch circuit of the buck circuit stage to charge the inductors of the multiple boost circuit stages, activating the fourth circuit of the buck circuit stage to discharge the inductors, deactivating the first switch circuits of the boost circuit stages, and activating the second switch circuits of the boost circuit stages to connect the inductors to the output.

In Aspect 3, the subject matter of one or both of Aspects 1 and 2 optionally includes a control circuit configured to operate the multi-phase buck-boost converter in a boost mode by: activating the first switch circuit of a first boost circuit stage out of phase with a first switch circuit of another boost circuit stage to charge the inductor of the first boost circuit stage, activating the second switch circuit of the first boost circuit stage out of phase with a second switch circuit of the other boost circuit stage to discharge the inductor of the first boost circuit stage, activating the third switch circuit of the buck circuit stage to connect the indictors to the input, and deactivating the fourth switch circuit of the buck circuit stage.

In Aspect 4, the subject matter of one or any combination of Aspects 1-3 optionally includes a control circuit is configured to operate the multi-phase buck-boost converter in a buck-boost mode by: activating the third switch circuit of the buck circuit stage to charge the inductors of the multiple boost circuit stages, activating the first switch circuit of a first boost circuit stage out of phase with a first switch circuit of another boost circuit stage to charge the inductor of the first boost circuit stage, activating the second switch circuit of the first boost circuit stage out of phase with a second switch circuit of the other boost circuit stage to connect the inductor of the first boost circuit stage to the output, and activating the fourth switch circuit of the buck circuit stage to discharge the inductors of the multiple boost circuit stages.

In Aspect 5, the subject matter of one or any combination of Aspect 1-4 optionally includes an error amplifier circuit configured to generate a control voltage signal by comparing the output voltage to a target voltage, and a peak inductor current detection circuit for each boost circuit stage, wherein each peak inductor current detection circuit compares inductor current of a corresponding inductor of the boost circuit stage to a peak inductor current level set according to the control voltage signal and a slope compensation signal for the boost circuit stage.

In Aspect 6, the subject matter of one or any combination of Aspects 1-5 optionally includes a peak inductor current detection circuit for the buck circuit stage, wherein the peak inductor current detection circuit for the buck circuit stage compares the inductor current of a first boost circuit stage to a peak inductor current level set according to the control voltage signal, a slope compensation signal of a boost circuit stage, and an offset voltage.

Aspect 7 includes subject matter (such as a method of operating a switching supply circuit) or can optionally be combined with one or any combination of Aspects 1-6 to include such subject matter, comprising operating multiple boost circuit stages out of phase with respect to each other to generate an output voltage from an input voltage to the switching supply circuit when the input voltage is less than the output voltage, wherein the multiple boost circuit stages are connected in parallel to each other and to an output of the switching supply circuit; operating a single buck circuit stage of the switching supply circuit to generate the output voltage when the input voltage is greater than the output voltage, wherein the buck circuit stage is coupled to an input of the switching supply circuit and the multiple boost circuit stages; and operating the multiple boost circuit stages out of phase with respect to each other and operating the buck circuit stage to generate the output voltage when the input voltage is within a predetermined range of the output voltage.

In Aspect 8, the subject matter of Aspect 7 optionally includes interleaving inductor currents of inductors of the multiple boost circuit stages out of phase with respect to each other.

In Aspect 9, the subject matter of one or both of Aspects 7 and 8 optionally includes charging an inductor of each boost circuit stage using a first switch circuit of each boost circuit stage and discharging the inductor of each boost stage to the output using a second switch circuit of each boost circuit stage; and charging the inductors of the multiple boost circuit stages using a third switch circuit and discharging the inductors using a fourth switch circuit.

In Aspect 10, the subject matter of one or any combination of Aspects 7-9 optionally includes generating a control voltage using an error amplifier, and using the same control voltage to set a peak current level in each of the inductors of the multiple boost circuit stages when the input voltage is less than the output voltage, when the input voltage is greater than the output voltage, and when the input voltage is within the predetermined range of the output voltage.

In Aspect 11, the subject matter of one or any combination of Aspects 7-9 optionally includes generating a control voltage using an error amplifier, and setting a peak current level for the inductor of each boost circuit stage using the same control voltage and a slope compensation signal for the corresponding boost circuit stage when the input voltage is less than the output voltage and when the input voltage is within the predetermined range of the output voltage.

In Aspect 12, the subject matter of Aspect 11 optionally includes setting a peak current level for the inductor of one boost circuit stage using the control voltage, a slope compensation signal for that boost circuit stage, and an offset voltage when the input voltage is greater than the output voltage.

In Aspect 13, the subject matter of one or any combination of Aspects 7-12 optionally includes de-energizing multiple inductors of the multiple boost circuit stages before the end of a switching cycle using a switch circuit of the buck circuit stage when the input voltage is within the predetermined range of the output voltage.

Aspect 14 includes subject matter (such as a switching converter circuit) or can optionally be combined with one or any combination of Aspects 1-13 to include such subject matter, comprising a multi-phase boost circuit stage including multiple boost circuits connected in parallel to an output of the switching converter circuit, where each boost circuit includes an inductor, a single-phase buck circuit stage coupled to an input of the switching converter and the inductors of the multiple boost circuits, and a control circuit. The control circuit is configured to generate multiple clock signals to drive the multiple boost circuits in a boost mode, wherein a first clock signal for a first boost circuit is out of phase with another clock signal for another boost circuit, use the multiple clock signals to drive the multiple boost circuits and the single-phase buck circuit stage in a buck-boost mode, and generate one clock signal to drive the buck circuit stage in a buck mode, wherein the one clock signal is used to energize the inductors of the multiple boost circuits.

In Aspect 15, the subject matter of Aspect 14 optionally includes each boost circuit includes a first switch circuit and a second switch circuit connected to the inductor of the boost circuit, and a control circuit configured to activate the first and second switch circuits of the first boost circuit using its corresponding clock signal to cause a peak current in the inductor of the first boost circuit; and activate the first and second switch circuits of the other boost circuit using its corresponding clock signal to cause a peak current in the inductor of the other boost circuit at a time that is interleaved with a time of the peak current in the inductor of the first boost circuit.

In Aspect 16, the subject matter of Aspect 15 optionally includes a buck circuit stage that includes a third switch circuit and a fourth switch circuit coupled to each inductor of the multiple boost circuits, and a control circuit configured to, when in the buck mode or the buck-boost mode, activate the third switch circuit using the one clock signal to energize the inductors of the multiple boost circuit stages and activate the fourth switch circuit using a peak inductor current detection circuit to de-energize the inductors of the multiple boost circuit stages.

In Aspect 17, the subject matter of one or any combination of Aspects 14-17 optionally includes a peak inductor current detection circuit for each boost circuit stage and each boost circuit includes a first switch circuit and a second switch circuit connected to the inductor of the boost circuit. The control circuit is configured to activate the first switch circuit of the first boost circuit using its corresponding clock signal to energize the inductor of the first boost circuit, and activate the first switch circuit of the other boost circuit using its corresponding clock signal to energize the inductor of the other boost circuit out of phase with the energizing of the inductor of the first boost circuit, and activate the second switch circuit of the first boost circuit using a first peak inductor current detection circuit to de-energize the inductor of the first boost circuit and activate the second switch circuit of the other boost circuit using another peak inductor current detection circuit to de-energize the inductor of the other boost circuit out of phase with the de-energizing of the inductor of the first boost circuit.

In Aspect 18, the subject matter of one or any combination of Aspects 14-17 optionally includes an error amplifier configured to generate a control voltage using the output voltage, and a peak inductor current detection circuit for each boost circuit stage, wherein each peak inductor current detection circuit compares inductor current of a corresponding inductor of the boost circuit stage to a peak inductor current level set according to the same control voltage signal and a slope compensation signal of the boost circuit stage.

In Aspect 19, the subject matter of Aspect 18 optionally includes a peak inductor current detection circuit for the buck circuit stage that compares the inductor current of a first boost circuit stage to a peak inductor current level set according to the same control voltage signal, a slope compensation signal for the first boost circuit stage, and an offset voltage.

In Aspect 20, the subject matter of one or any combination of Aspects 14-19 optionally includes multi-phase boost circuit stage includes N boost circuit stages, where N is an integer greater than one, and wherein the control circuit is configured to generate N clock signals evenly spaced out of phase with respect to each other to drive the N boost circuit stages.

These non-limiting Aspects can be combined in any combination or permutation. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A multi-phase buck-boost converter circuit comprising:
    a buck circuit stage connected to an input of the buck-boost converter circuit to receive an input voltage;
    a boost circuit stage including multiple boost circuits connected in parallel, wherein the boost circuit stage is coupled to the buck circuit stage and an output of the multi-phase buck-boost converter circuit, where each boost circuit includes an inductor coupled to the buck circuit stage;
    a control circuit configured to:
    operate the multiple boost circuit stages out of phase with respect to each other in a boost mode to generate an output voltage from the input voltage when the input voltage is less than the output voltage;
    operate the buck circuit stage in a buck mode to generate the output voltage when the input voltage is greater than the output voltage; and
    operate the multiple boost circuit stages out of phase with respect to each other and operate the buck circuit stage to generate the output voltage in a buck-boost mode when the input voltage is within a predetermined range of the output voltage; and
    a peak inductor current detection circuit for the buck circuit stage, wherein the peak inductor current detection circuit for the buck circuit stage compares a peak inductor current of a first boost circuit stage of the multiple boost circuits determined using a slope compensation signal to a control voltage signal and an offset voltage.

2. The multi-phase buck-boost converter circuit of claim 1,
    wherein each boost circuit stage includes a first switch circuit and a second switch circuit;
    wherein the buck circuit stage includes a third switch circuit and a fourth switch circuit; and
    wherein the control circuit is configured to operate the multi-phase buck-boost converter in a buck mode by:
    activating the third switch circuit of the buck circuit stage to charge the inductors of the multiple boost circuit stages;
    activating the fourth circuit of the buck circuit stage to discharge the inductors;
    deactivating the first switch circuits of the boost circuit stages; and
    activating the second switch circuits of the boost circuit stages to connect the inductors to the output.

3. The multi-phase buck-boost converter circuit of claim 1,
    wherein each boost circuit stage includes a first switch circuit and a second switch circuit;
    wherein the buck circuit stage includes a third switch circuit and a fourth switch circuit; and
    wherein the control circuit is configured to operate the multi-phase buck-boost converter in a boost mode by:
    activating the first switch circuit of a first boost circuit stage out of phase with a first switch circuit of another boost circuit stage to charge the inductor of the first boost circuit stage;
    activating the second switch circuit of the first boost circuit stage out of phase with a second switch circuit of the other boost circuit stage to discharge the inductor of the first boost circuit stage;
    activating the third switch circuit of the buck circuit stage to connect the indictors to the input; and
    deactivating the fourth switch circuit of the buck circuit stage.

4. The multi-phase buck-boost converter circuit of claim 1,
    wherein each boost circuit stage includes a first switch circuit and a second switch circuit;
    wherein the buck circuit stage includes a third switch circuit and a fourth switch circuit; and
    wherein the control circuit is configured to operate the multi-phase buck-boost converter in a buck-boost mode by:
    activating the third switch circuit of the buck circuit stage to charge the inductors of the multiple boost circuit stages;
    activating the first switch circuit of a first boost circuit stage out of phase with a first switch circuit of another boost circuit stage to charge the inductor of the first boost circuit stage;
    activating the second switch circuit of the first boost circuit stage out of phase with a second switch circuit of the other boost circuit stage to connect the inductor of the first boost circuit stage to the output; and
    activating the fourth switch circuit of the buck circuit stage to discharge the inductors of the multiple boost circuit stages.

5. The multi-phase buck-boost converter circuit of claim 1, including:
    an error amplifier circuit configured to generate a control voltage signal by comparing the output voltage to a target voltage; and
    a peak inductor current detection circuit for each boost circuit stage, wherein each peak inductor current detection circuit compares a peak inductor current level of a corresponding inductor of the boost circuit stage determined using a slope compensation signal to the control voltage signal.

6. A method of operating a switching supply circuit, the method comprising:
- operating multiple boost circuit stages out of phase with respect to each other in a boost mode to generate an output voltage from an input voltage to the switching supply circuit when the input voltage is less than the output voltage, wherein the multiple boost circuit stages are connected in parallel to each other and to an output of the switching supply circuit;
- operating a single buck circuit stage of the switching supply circuit in a buck mode to generate the output voltage when the input voltage is greater than the output voltage, wherein the buck circuit stage is coupled to an input of the switching supply circuit and the multiple boost circuit stages;
- operating the multiple boost circuit stages out of phase with respect to each other and operating the single buck circuit stage in a buck-boost mode to generate the output voltage when the input voltage is within a predetermined range of the output voltage; and
- de-energizing multiple inductors of the multiple boost circuit stages before the end of a switching cycle using a switch circuit of the buck circuit stage when the input voltage is within the predetermined range of the output voltage.

7. The method of claim 6, wherein operating the multiple boost circuit stages out of phase with respect to each other includes interleaving inductor currents of inductors of the multiple boost circuit stages out of phase with respect to each other.

8. The method of claim 6,
- wherein operating the multiple boost circuit stages includes charging an inductor of each boost circuit stage using a first switch circuit of each boost circuit stage and discharging the inductor of each boost stage to the output using a second switch circuit of each boost circuit stage; and
- wherein operating the single buck circuit stage includes charging the inductors of the multiple boost circuit stages using a third switch circuit and discharging the inductors using a fourth switch circuit.

9. The method of claim 6, including:
- generating a control voltage using an error amplifier; and
- using the same control voltage to set a peak current level in each of the inductors of the multiple boost circuit stages when the input voltage is less than the output voltage, when the input voltage is greater than the output voltage, and when the input voltage is within the predetermined range of the output voltage.

10. The method of claim 6, including:
- generating a control voltage using an error amplifier; and
- setting a peak current level for the inductor of each boost circuit stage using the same control voltage and a slope compensation signal for the corresponding boost circuit stage when the input voltage is less than the output voltage and when the input voltage is within the predetermined range of the output voltage.

11. The method of claim 10, including setting a peak current level for the inductor of one boost circuit stage using the control voltage, a slope compensation signal for that boost circuit stage, and an offset voltage when the input voltage is greater than the output voltage.

12. A switching converter circuit comprising:
- a multi-phase boost circuit stage including multiple boost circuits connected in parallel to an output of the switching converter circuit, where each boost circuit includes an inductor;
- a single-phase buck circuit stage coupled to an input of the switching converter and the inductors of the multiple boost circuits;
- a control circuit configured to:
- generate multiple clock signals to drive the multiple boost circuits in a boost mode when the input voltage is less than the output voltage, wherein a first clock signal for a first boost circuit is out of phase with another clock signal for another boost circuit when the input voltage is greater than the output voltage;
- use the multiple clock signals to drive the multiple boost circuits and the single-phase buck circuit stage in a buck-boost mode when the input voltage is within a predetermined range of the output voltage; and
- generate one clock signal to drive the buck circuit stage in a buck mode, wherein the one clock signal is used to energize the inductors of the multiple boost circuits; and
- a peak inductor current detection circuit for the buck circuit stage; wherein the peak inductor current detection circuit for the buck circuit stage compares a peak inductor current of a first boost circuit stage determined using a slope compensation signal to a control voltage signal and an offset voltage.

13. The switching converter circuit of claim 12,
- wherein each boost circuit includes a first switch circuit and a second switch circuit connected to the inductor of the boost circuit; and
- wherein control circuit is configured to:
- activate the first and second switch circuits of the first boost circuit using its corresponding clock signal to cause a peak current in the inductor of the first boost circuit; and
- activate the first and second switch circuits of the other boost circuit using its corresponding clock signal to cause a peak current in the inductor of the other boost circuit at a time that is interleaved with a time of the peak current in the inductor of the first boost circuit.

14. The switching converter circuit of claim 13,
- wherein the buck circuit stage includes a third switch circuit and a fourth switch circuit coupled to each inductor of the multiple boost circuits; and
- wherein the control circuit is configured to: when in the buck mode or the buck-boost mode, activate the third switch circuit using the one clock signal to energize the inductors of the multiple boost circuit stages and activate the fourth switch circuit using a peak inductor current detection circuit to de-energize the inductors of the multiple boost circuit stages.

15. The switching converter circuit of claim 12, including:
- a peak inductor current detection circuit for each boost circuit stage;
- wherein each boost circuit includes a first switch circuit and a second switch circuit connected to the inductor of the boost circuit; and
- wherein the control circuit is configured to, when in the boost mode or the buck-boost mode:
- activate the first switch circuit of the first boost circuit using its corresponding clock signal to energize the inductor of the first boost circuit, and activate the first switch circuit of the other boost circuit using its corresponding clock signal to energize the inductor of the other boost circuit out of phase with the energizing of the inductor of the first boost circuit; and
- activate the second switch circuit of the first boost circuit using a first peak inductor current detection circuit to de-energize the inductor of the first boost circuit and activate the second switch circuit of the other boost circuit using another peak inductor current detection circuit to de-energize the inductor of the other boost circuit out of phase with the de-energizing of the inductor of the first boost circuit.

16. The switching converter circuit of claim 12, including:
an error amplifier configured to generate the control voltage using an output voltage; and
a peak inductor current detection circuit for each boost circuit stage, wherein each peak inductor current detection circuit compares a peak inductor current level of a corresponding inductor of the boost circuit stage determined using a slope compensation signal to the control voltage signal.

17. The switching converter circuit of claim 12, wherein the multi-phase boost circuit stage includes N boost circuit stages, where N is an integer greater than one, and wherein the control circuit is configured to generate N clock signals evenly spaced out of phase with respect to each other to drive the N boost circuit stages.

* * * * *